United States Patent
Harrison et al.

(10) Patent No.: US 7,987,067 B2
(45) Date of Patent: Jul. 26, 2011

(54) METHOD AND APPARATUS FOR OPTIMIZING WIND TURBINE OPERATION

(75) Inventors: Paula Marie Harrison, Greenville, SC (US); Angela Patterson, Blacksburg, VA (US); Philippe Giguere, Simpsonville, SC (US); Nicholas Tobergte, Greenville, SC (US); Colin McCulloch, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/748,007

(22) Filed: Mar. 26, 2010

(65) Prior Publication Data

US 2011/0133458 A1    Jun. 9, 2011

(51) Int. Cl.
*G06F 19/00* (2011.01)
(52) U.S. Cl. ...................................... 702/122
(58) Field of Classification Search .............. 702/122, 702/182–185
See application file for complete search history.

(56) References Cited

U.S. PATENT DOCUMENTS

| | | | |
|---|---|---|---|
| 6,940,185 B2 | 9/2005 | Anderson et al. | |
| 7,101,152 B2 | 9/2006 | Wobben | |
| 7,387,491 B2 | 6/2008 | Saddoughi et al. | |
| 7,484,933 B2 | 2/2009 | Wobben | |
| 7,560,823 B2 | 7/2009 | Schellings | |
| 7,571,013 B2 | 8/2009 | Altemark | |
| 7,632,068 B2 | 12/2009 | Bak et al. | |
| 2009/0184519 A1 | 7/2009 | Nies et al. | |
| 2009/0259429 A1* | 10/2009 | Elisiussen | 702/113 |
| 2009/0295159 A1 | 12/2009 | Johnson et al. | |
| 2010/0158688 A1* | 6/2010 | Benito et al. | 416/39 |
| 2010/0312594 A1* | 12/2010 | Andersen et al. | 705/7 |

* cited by examiner

*Primary Examiner* — Edward Raymond
(74) *Attorney, Agent, or Firm* — James McGinness, Esq; Armstrong Teasdale LLP

(57) ABSTRACT

A method for optimizing an operation of at least one wind turbine includes defining a plurality of test parameters that include a plurality of test points for at least one wind turbine operational parameter, wherein each test point includes a plurality of test values for the wind turbine operational parameter, and defining at least one test sequence of the plurality of test points. The method also includes initiating a test that executes the plurality of test points within the at least one randomized test sequence and measures at least one operating condition of the at least one wind turbine at each test point.

20 Claims, 5 Drawing Sheets

METHOD AND APPARATUS FOR OPTIMIZING WIND TURBINE OPERATION

BACKGROUND OF THE INVENTION

The subject matter described herein relates generally to wind turbines and, more particularly, to a method and apparatus for optimizing wind turbine operation.

Known wind turbines have a plurality of mechanical and electrical components. For example, a wind turbine generally includes a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Such configurations may also include power converters that are used to convert a frequency of generated electric power to a frequency substantially similar to a utility grid frequency. Other electrical and/or mechanical components are also included in known wind turbine configurations.

Each electrical and/or mechanical component may have one or more parameters associated with the component that define one or more operational characteristics of the component. The operational parameters are often set to default values during installation or setup of the wind turbine. However, one or more irregularities may be present within one or more components such that the default values of one or more parameters may not be suitable or optimized for each wind turbine. Further, seasonal variations in environmental or atmospheric conditions in which the wind turbine operates may result in sub-optimal operation.

BRIEF DESCRIPTION OF THE INVENTION

In one aspect, a method for optimizing an operation of at least one wind turbine is provided that includes defining a plurality of test parameters that include a plurality of test points for at least one wind turbine operational parameter, wherein each test point of the plurality of test points includes a plurality of test values for the at least one wind turbine operational parameter, and defining at least one test sequence of the plurality of test points. The method also includes initiating a test that executes the plurality of test points within the at least one test sequence and measures at least one operating condition of the at least one wind turbine at each test point.

In another aspect, a test system for a wind turbine is provided that includes at least one measurement device configured to measure at least one operating condition of the wind turbine and a controller communicatively coupled to the measurement device. The controller is configured to execute a wind turbine test that includes defining a plurality of test points for at least one wind turbine operational parameter, each test point including at least one test value for the wind turbine operational parameter. The wind turbine test also includes determining a randomized test sequence of the plurality of test points.

In yet another aspect, a wind turbine is provided that includes at least one component including at least one of a blade, a rotor, a gearbox, a power converter, and a generator. The wind turbine also includes at least one measurement device configured to measure at least one operating condition of the wind turbine and a controller communicatively coupled to the measurement device. The controller is configured to execute a wind turbine test that includes defining a plurality of test points for at least one wind turbine operational parameter associated with the component, wherein each test point of the plurality of test points includes a plurality of test values for the wind turbine operational parameter. The wind turbine test also includes determining a test sequence of the plurality of test points, iterating through the test sequence, and measuring the operating condition of the wind turbine at each test point.

DETAILED DESCRIPTION OF THE INVENTION

The embodiments described herein test one or more operational parameters of a wind turbine to facilitate selecting a desired or optimal value for the operational parameter. A wind turbine test includes a randomized test sequence of test points, and each test point includes at least one test value and a test point duration. At each test point, the operational parameter is set to the test value and at least one operating condition of the wind turbine is measured during the test point duration. The random selection of test points within the test sequence facilitates reducing an effect or a skewing of test data due to changing environmental conditions. Moreover, individual test points may be included more than once within the test sequence to aid in downstream response surface model building and testing goodness-of-fit. The execution of the wind turbine test and the measurements of one or more operating conditions of the wind turbine at each test point facilitate providing a robust body of test data that may be used to optimize or select a desired value for the operational parameter.

Figure 1:
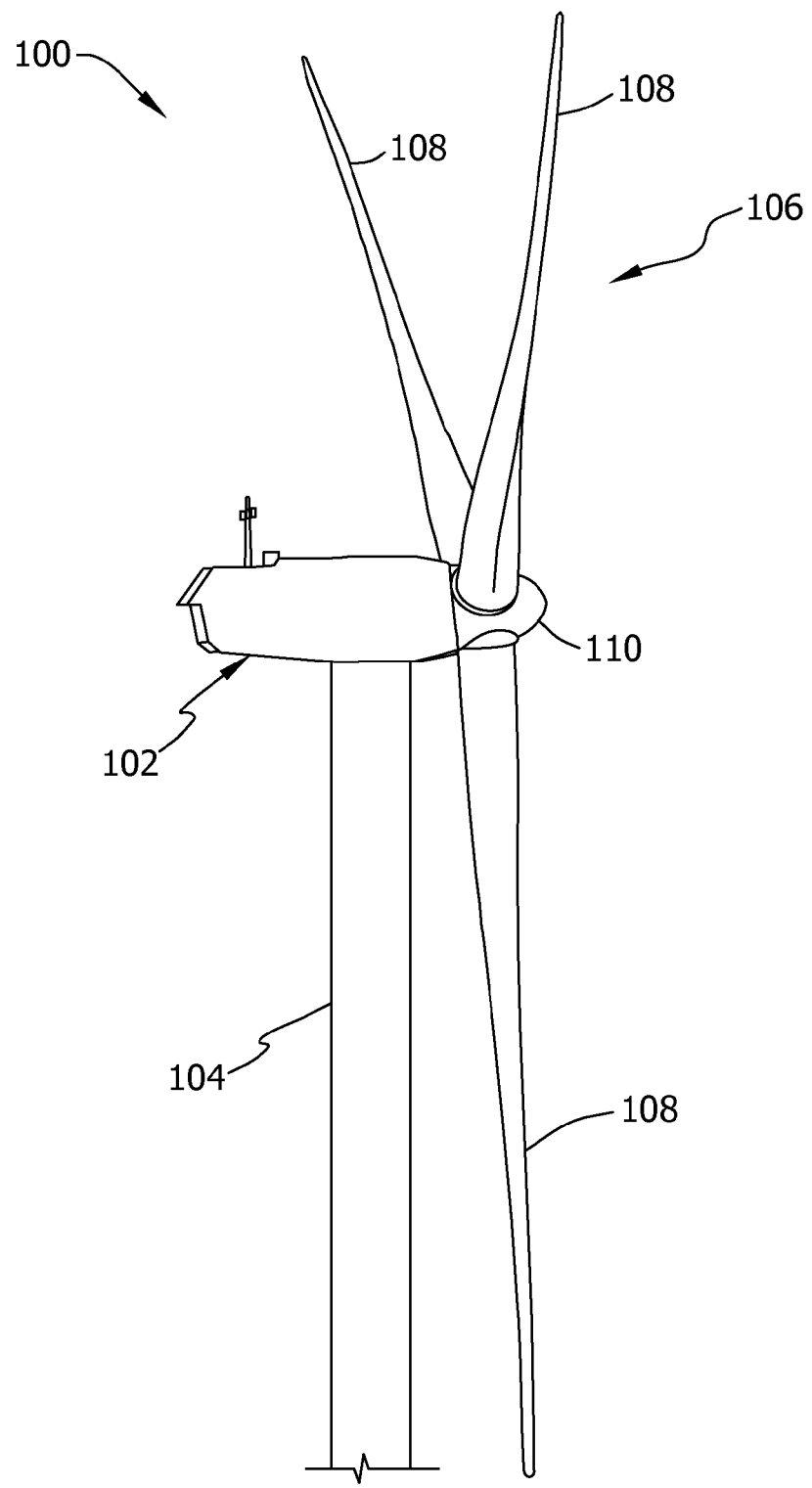
FIG. 1 is a perspective view of a portion of an exemplary wind turbine.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

Figure 2:
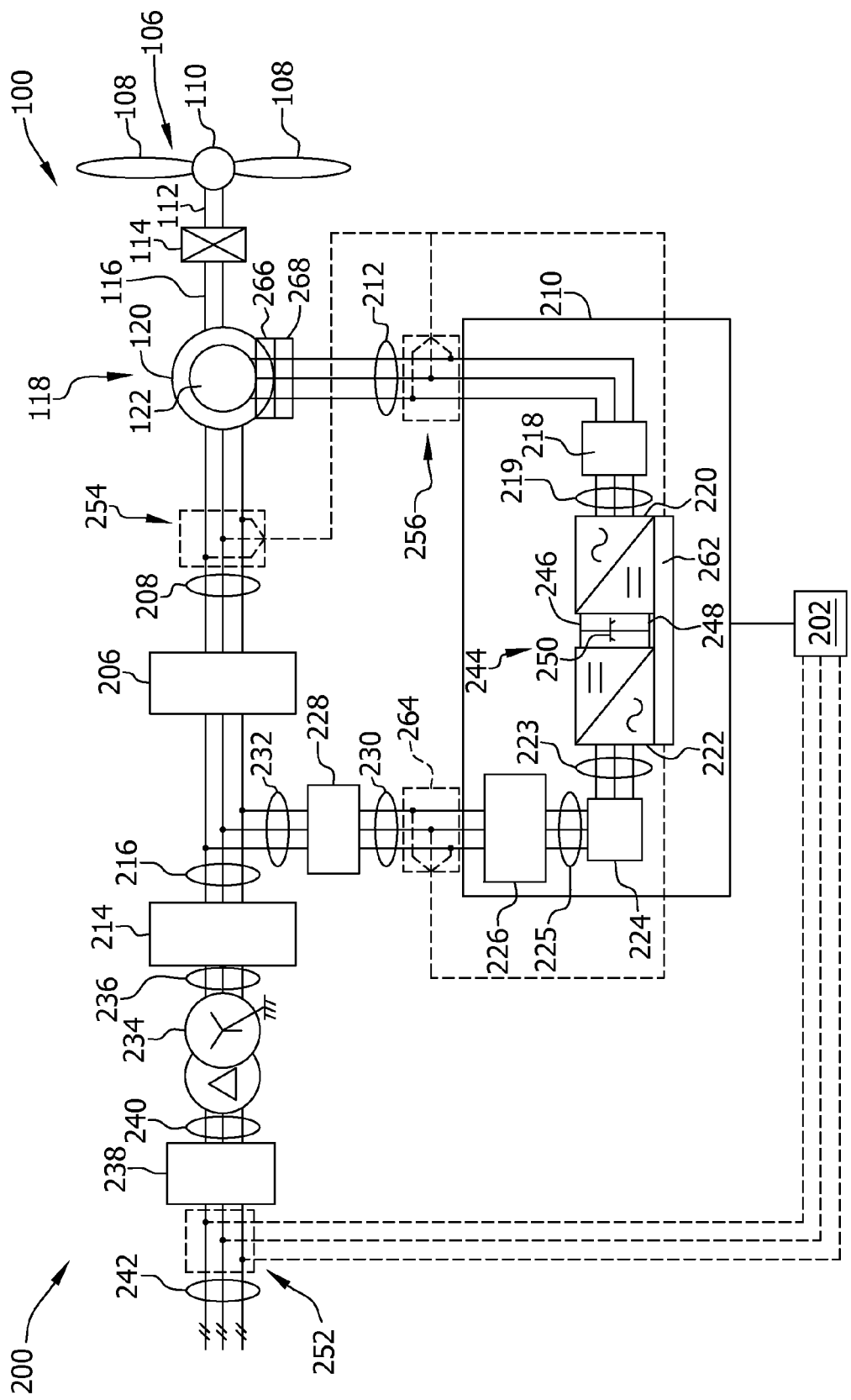
FIG. 2 is a schematic view of an exemplary electrical and control system suitable for use with the wind turbine shown in FIG. 1.

FIG. 2 is a schematic view of an exemplary electrical and control system 200 that may be used with wind turbine 100. Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) and/or a hard disk (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) include, without limitation, computer peripherals associated with an operator interface such as a mouse and a keyboard (neither shown in FIG. 2). Further, in the exemplary embodiment, additional output channels may include, without limitation, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive one or more voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive one or more voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions and/or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

Figure 3:
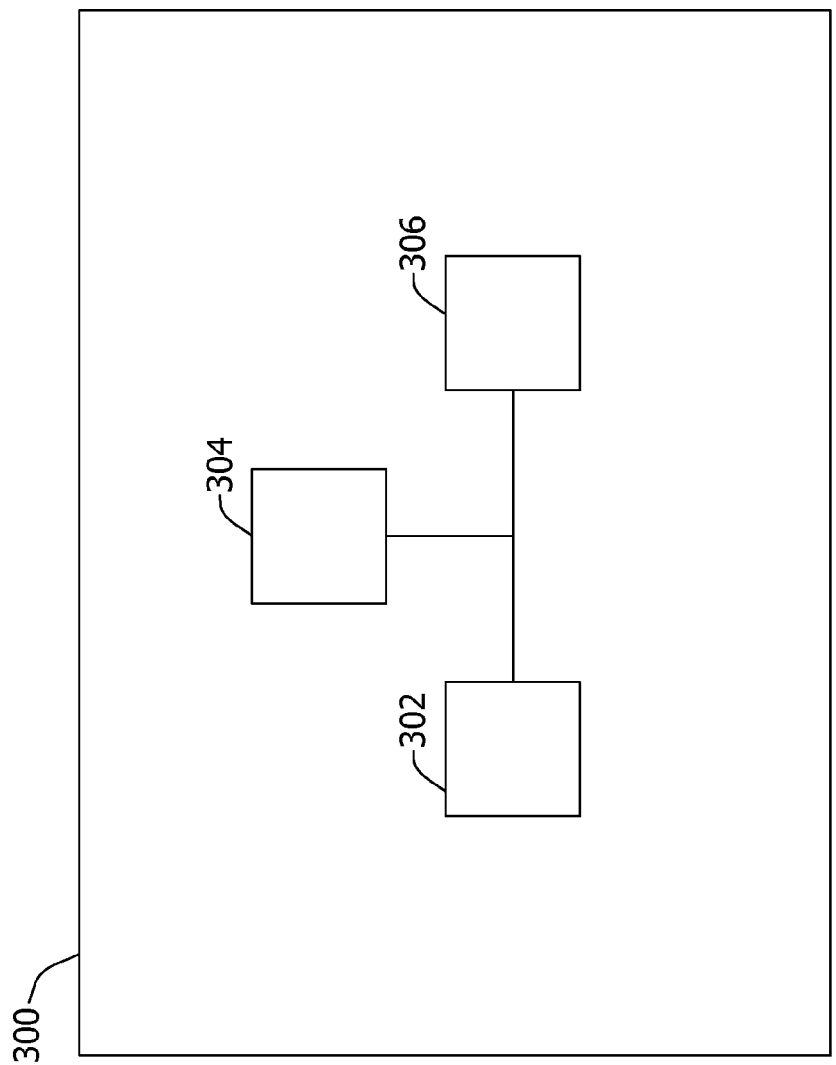
FIG. 3 is a block diagram of an exemplary test system suitable for use with the wind turbine shown in FIG. 1.

FIG. 3 is a block diagram of an exemplary test system 300 suitable for use with wind turbine 100 (shown in FIG. 1) and/or electrical and control system 200 (shown in FIG. 2). In the exemplary embodiment, test system 300 includes a controller 302, a memory 304, and at least one measurement device 306. Controller 302 includes turbine controller 202, converter controller 262 (both shown in FIG. 2), and/or any suitable controller within wind turbine 100. Alternatively, controller 302 includes a controller and/or a control system (not shown) located remotely from wind turbine 100, such as within a wind farm management system (not shown), and/or within any suitable system. Memory 304 includes a computer readable medium, including, without limitation, a hard disk drive, a solid state drive, a diskette, a compact disc, a digital video disc, flash memory, and/or random access memory (RAM). Memory 304 stores instructions and/or data associated with one or more wind turbine tests and/or any suitable data for use with controller 302 and/or test system 300.

In the exemplary embodiment, test system 300 includes a plurality of measurement devices 306 that include one or more sensors that measure one or more operating conditions of wind turbine 100. In one embodiment, measurement devices 306 include, for example, one or more of the following: first set of voltage and electric current sensors 252, second set of voltage and electric current sensors 254, third set of voltage and electric current sensors 256, fourth set of voltage and electric current sensors 264 (all shown in FIG. 2), a wind speed sensor, a wind direction sensor, an air density sensor, a temperature sensor, an accelerometer, and/or any suitable sensor. Alternatively, measurement devices 306 include or are replaced by turbine controller 202, converter controller 262, and/or any suitable device that provides one or more measurements of an operating condition of wind turbine 100.

In the exemplary embodiment, the operating conditions of wind turbine 100 include, without limitation, a generated power, a generated torque, a rotational speed of rotor 106 (shown in FIG. 2), a mechanical loading of one or more components of wind turbine 100, an air density, an altitude, a wind speed, a wind direction, an ambient temperature, and/or any suitable condition at or within wind turbine 100.

Test system 300 executes one or more tests to determine a desired or optimized value for one or more parameters associated with wind turbine 100 and/or one or more wind turbine components. For example, test system 300 executes one or more tests to determine a desired or optimized pitch angle for one or more blades 108 (shown in FIG. 1), or any suitable parameter for wind turbine 100 and/or for any suitable wind turbine component. Other suitable wind turbine components to be tested may include, without limitation, rotor 106, gearbox 114, rotor-side power converter 220, line-side power converter 222, generator stator 120, and/or generator rotor 122 (all shown in FIG. 2). As used herein, the term "optimized" or "optimal" refers to maximizing and/or achieving a desired value or function of one or more performance aspects or combinations of performance aspects of wind turbine 100 and/or of a plurality of wind turbines 100.

In one embodiment, the performance aspects may include, without limitation, a power production, a fatigue loading, an amount of vibration, a fatigue life, a variation of power production, a wake effect, and/or any suitable aspect of wind turbine 100 and/or a plurality of wind turbines 100. Moreover, any suitable combination of performance aspects of wind turbine 100 and/or a plurality of wind turbines 100 may be maximized or set to a desired value or function by optimizing one or more operational parameters. For example, optimizing an operational parameter value may include maximizing a power production of wind turbine 100 while maintaining a fatigue loading of wind turbine 100 within suitable constraints such that a desired operational life of wind turbine 100 is preserved.

Figure 4:
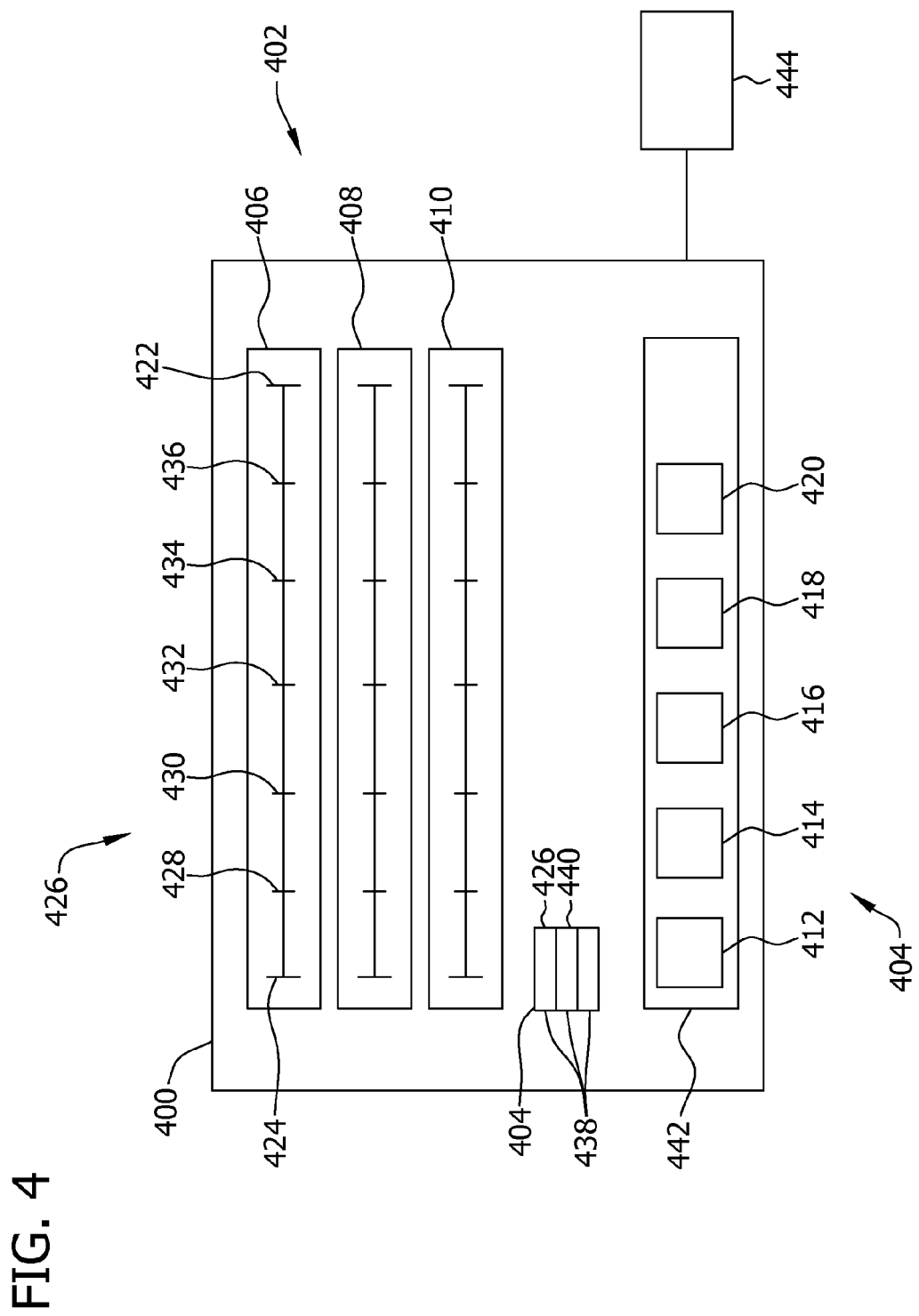
FIG. 4 is a block diagram of an exemplary wind turbine test suitable for use with the test system shown in FIG. 3.

FIG. 4 is a block diagram of an exemplary wind turbine test 400 suitable for use with test system 300 (shown in FIG. 3), electrical and control system 200 (shown in FIG. 2), and/or wind turbine 100 (shown in FIG. 1). In the exemplary embodiment, wind turbine test 400 includes at least one operational parameter 402 associated with at least one wind turbine component, and at least one test point 404 for each operational parameter 402. While FIG. 4 shows three operational parameters 402, including a first operational parameter 406, a second operational parameter 408, and a third operational parameter 410, any suitable number of operational parameters 402, including a single operational parameter 402, are included and/or tested within wind turbine test 400. Moreover, while FIG. 4 shows five test points 404, including a first test point 412, a second test point 414, a third test point 416, a fourth test point 418, and a fifth test point 420, any suitable number of test points 404 are included and/or tested within wind turbine test 400.

Wind turbine test 400 is executed by controller 302 (shown in FIG. 3), turbine controller 202, a wind farm management controller (not shown), and/or any suitable controller. Wind turbine test 400 is stored at least partially within memory 304 (shown in FIG. 3). Alternatively, wind turbine test 400 is stored within any suitable memory within wind turbine 100, a wind farm management system, and/or any suitable system.

Operational parameter 402 represents a variable or other representation of an operating setpoint or operating characteristic associated with the wind turbine component. For example, operational parameter 402 represents a pitch angle for an individual blade 108 or for a combination of blades 108, or any suitable parameter. Within wind turbine test 400, an upper limit 422 and a lower limit 424 are defined for operational parameter 402. Upper limit 422 and lower limit 424 define constraints for operational parameter 402 such that a value of operational parameter 402 is prevented from increasing above upper limit 422 and from decreasing below lower limit 424 during wind turbine test 400. A plurality of test values 426 are defined between and/or including upper limit 422 and/or lower limit 424. While FIG. 4 shows five test values 426, including a first test value 428, a second test value 430, a third test value 432, a fourth test value 434, and a fifth test value 436, any suitable number of test values 426 are defined between and/or including upper limit 422 and/or lower limit 424, including a single test value 426. In one embodiment, test values 426 are evenly distributed between upper limit 422 and lower limit 424. In the exemplary embodiment, test values 426 are chosen to exercise suitable values of operational parameter 402 as desired, and are not necessarily evenly distributed between upper limit 422 and lower limit 424.

Any suitable number of test points 404 are defined for operational parameter 402 within wind turbine test 400. Test points 404 represent test stages or steps that wind turbine test 400 executes. Each test point 404 includes at least one test point component 438, such as, for example, one or more test values 426 for one or more operational parameters 402, a test point duration 440, and/or any suitable component. For example, in one embodiment, each test point 404 may include an individual test value 426 for a pitch angle of each blade 108. In one embodiment, a pitch angle offset of each blade 108 is independently varied between about 5 degrees and about negative 5 degrees from a default or initial pitch angle. In a more specific embodiment, a pitch angle offset for each blade 108 is independently varied between about 2 degrees and about negative 2 degrees from the default or initial pitch angle. In such embodiments, test values 426 of each test point 404 are set to different combinations of individual pitch angles of each blade 108. Alternatively, each test point 404 may include any suitable type and number of test values 426. In the exemplary embodiment, each test point 404 includes a test point duration 440. In one embodiment, test point duration 440 is between about 1 minute and about 60 minutes. In a more specific embodiment, test point duration 440 is about 10 minutes. Alternatively, test point duration 440 is any suitable time period, and test point duration 440 may be different for each test point 404.

In the exemplary embodiment, wind turbine test 400 includes a test sequence 442 that defines an order of execution of each test point 404. Test sequence 442 includes at least one instance of each test point 404. Wind turbine test 400 identifies an overall iteration count or repetition count that determines a number of instances that test points 404 are included within test sequence 442. Alternatively, an iteration count or repetition count may be identified for each individual test point 404 such that certain test points 404 may be included within test sequence 442 a different number of times or instances than other test points 404. As such, test sequence 442 may include multiple instances of one or more test points 404. In the exemplary embodiment, test sequence 442 is determined by randomly choosing an order of test points 404 to be executed, and each test point 404 is included within test sequence 442 a number of times specified by the iteration count. In one embodiment, test sequence 442 includes the same number of test points 404 in subsequent executions of wind turbine test 400. Moreover, a duration of test sequence 442 is any suitable duration that enables each test point 404 to be executed at least one time. Alternatively, test sequence 442 includes any suitable number of test points 404 and/or any suitable duration. In the exemplary embodiment, test points 404 are executed randomly within wind turbine test 400, and therefore, test values 426 of each operational parameter 402 are also tested randomly. The randomized order of test sequence 442 reduces or eliminates a distortion or skewing of test data that may otherwise occur because of changing environmental conditions during execution of wind turbine test 400. As used herein, the terms "random" and "randomized" refer to generating one or more numbers that are suitably non-deterministic and/or selecting one or more numbers from a set of numbers, such that each number within the set has a substantially equal probability of being selected. Alternatively, test sequence 442 is determined by a pseudorandom algorithm or other suitable algorithm.

In an alternative embodiment, test sequence 442 uses a substantially non-random algorithm to determine an order of test points 404. In one embodiment, test sequence 442 includes a set of predefined test points 404 and/or test values 426 that wind turbine test 400 loops or cycles through continually or a defined number of times. In such an embodiment, each time wind turbine test 400 starts a new loop or iteration, one or more test values 426 of one or more test points 404 may be incremented, decremented, and/or modified by a defined amount or function. Alternatively, test sequence 442 includes a set of predefined test points 404 and/or test values 426 that wind turbine test 400 loops through, and at one or more test points 404, one or more test values 426 are selected from one or more subsets of values associated with the test point 404 and/or loop. In another embodiment, test sequence 442 uses a rasterizing or interleaving pattern or algorithm, and/or any suitable quasi-random or deterministic algorithm to select an order of test points 404 for wind turbine test 400 to execute.

In one embodiment, a plurality of test sequences 442 is defined within wind turbine test 400. Each test sequence 442 is associated with a suitable operational condition, such that an individual test sequence 442 is executed when the operational condition is measured to be at a defined value or range of values. For example, a plurality of test sequences 442 are associated with different wind speeds, such that an individual test sequence 442 is executed within different ranges and/or values of the wind speed. In such an embodiment, each test sequence 442 may use a different randomization or other suitable technique and/or algorithm, and/or each test sequence 442 may include a different number of test points 404. Moreover, each test point 404 of the individual test sequences may include different test values 426 and/or test point durations 440 from test values 426 and/or test point durations 440 of other test sequences 442. Additionally, wind turbine test 400 may start executing test points 404 from one test sequence 442 and switch to execute test points 404 from another test sequence 442 if the operational condition changes.

In another embodiment, wind turbine test 400 is executed on a plurality of wind turbines 100. A number of wind turbines 100 to execute wind turbine test 400 is first determined. In such an embodiment, one or more components of wind turbine test 400 may vary between wind turbines 100. For example, test sequence 442, test values 426, test point duration 440, and/or any suitable component of wind turbine test 400 may be different between wind turbines 100. Moreover, test data from a first wind turbine test 400 executing on a first wind turbine 100 may be used to optimize or select one or more desired operational parameters of a second wind turbine 100. For example, first wind turbine 100 may be upwind of second wind turbine 100 such that first wind turbine 100 at least partially blocks an amount of wind usable by second wind turbine 100. In such a situation, a wind farm management system or another suitable system may use test data from first wind turbine test 400 and/or second wind turbine test 400 to balance a power production of first wind turbine 100 and second wind turbine 100. As such, one or more operational parameters of each wind turbine 100 within a wind farm may be optimized, balanced, or set to desired values.

Moreover, wind turbine test 400 may receive data from a source 444 external to wind turbine 100. More specifically, wind turbine test 400 may receive data from another wind turbine 100, a wind turbine test 400 executing on another wind turbine 100, and/or from any other suitable system or device. For example, a wind turbine test 400 executing on a first wind turbine 100 may receive data from one or more wind turbine tests 400 executing on one or more other wind turbines 100. Additionally or alternatively, wind turbine test 400 may receive data from one or more measurement devices or systems including, without limitation, a meteorological mast, an anemometer, a light detection and ranging (LIDAR) system, a sonic detection and ranging (SODAR) system, and/or any other suitable measurement system or device. These systems and/or devices may be part of the same wind farm, from different wind farms, or independent of any wind farm. The data received may include, without limitation, a wind speed measurement, a temperature measurement, an air pressure measurement, and/or any suitable measurement or other data that enables wind turbine test 400 to operate as described herein. Wind turbine test 400 may combine the received data with other data generated and/or received by wind turbine test 400 to optimize one or more operational parameters of wind turbine 100.

Wind turbine test 400 may be executed at any suitable frequency, including, without limitation, once, weekly, monthly, seasonally, annually, and/or upon demand. Moreover, wind turbine test 400 may be executed or initiated upon an occurrence of a triggering event, such as receiving an alarm, an alert, a notification that a performance of wind turbine 100 has degraded, and/or any suitable event. Wind turbine test 400 may be installed and/or updated using a local interface (not shown) at wind turbine 100 and/or using a remote interface (not shown).

During execution, wind turbine test 400 iterates through each test point 404 within test sequence 442. Wind turbine test 400 waits or remains at each test point 404 for test point duration 440 before executing the next test point 404 within test sequence 442. At each test point 404, operational parameters 402 are set to test values 426 associated with each operational parameter 402, and one or more operating conditions of wind turbine 100 are measured by measurement devices 306 (shown in FIG. 3) during test point duration 440. Controller 302 and/or wind turbine test 400 receives the measured operating condition data and/or other suitable test data at each test point 404. Test data, including the measured operating condition data, is stored within memory 304 or within any suitable memory including, without limitation, a wind farm storage or other suitable remote storage, for later retrieval and/or analysis at the end of each test point 404 (i.e., when test point duration 440 for each test point 404 has elapsed), or at any suitable time within test point duration 440 and/or test point 404. Other suitable test data, such as a number of test points 404 that have been executed, a current status or value of one or more control variables, a time stamp associated with one or more measured operating condition data, and/or any suitable data may also be stored in memory 304 or within any suitable memory and associated with the measured operation condition data for each test point 404.

The test data may be retrieved from memory 304 using a remote interface (not shown), a supervisory control and data acquisition (SCADA) interface, and/or any suitable interface. The test data may be used to optimize and/or select a desired value for operational parameters 402. Wind turbine test 400 ends or terminates when each test point 404 within test sequence 442 is executed. After wind turbine test 400 has ended, a suitable data analysis may be generated and/or calculated from the test data.

Figure 5:
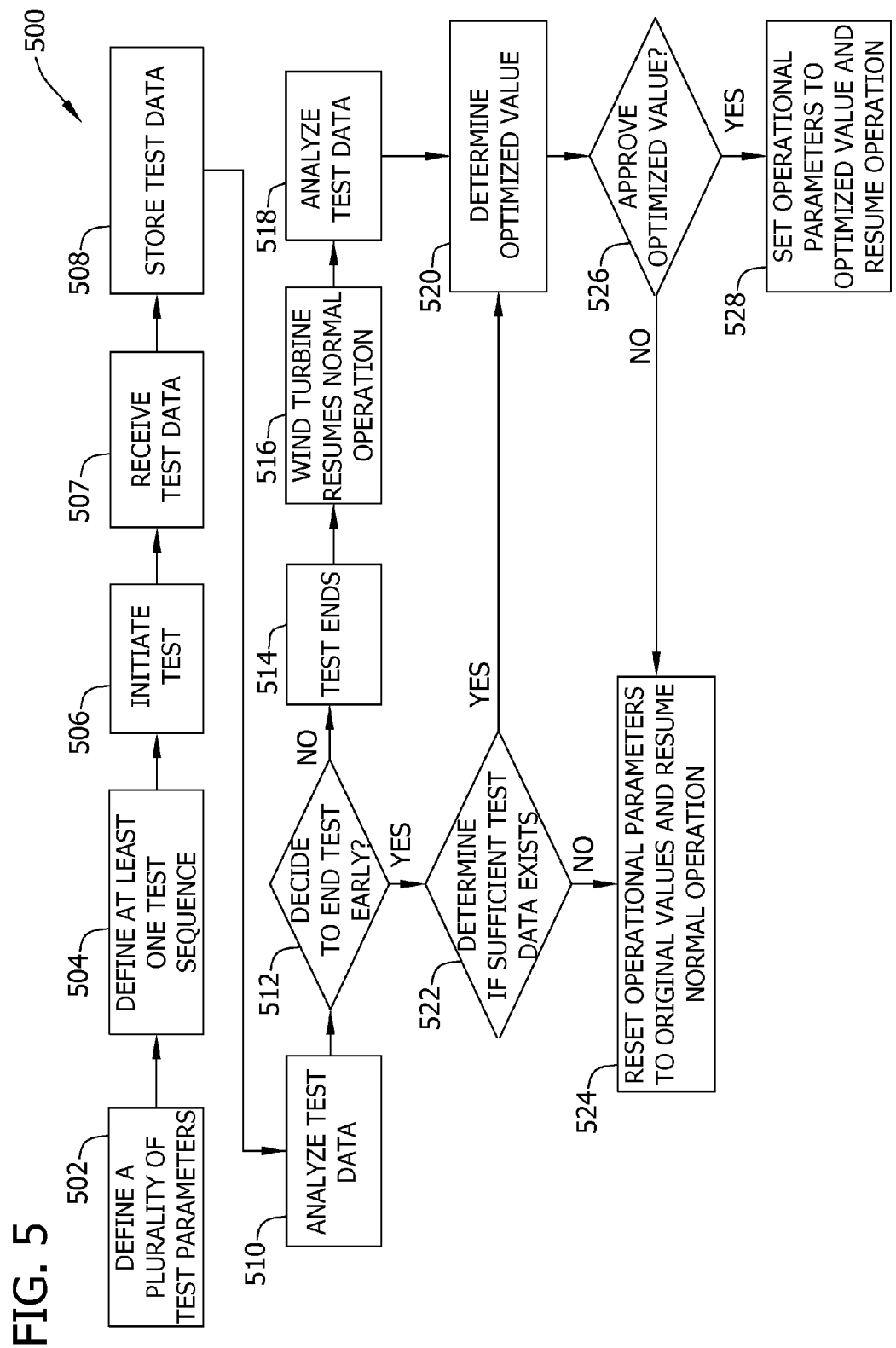
FIG. 5 is a flow diagram of an exemplary method for optimizing a wind turbine suitable for use with the wind turbine test shown in FIG. 4 and/or the test system shown in FIG. 3.

FIG. 5 is an exemplary method 500 for optimizing an operation of at least one wind turbine 100 (shown in FIG. 1). In the exemplary embodiment, method 500 uses wind turbine test 400 (shown in FIG. 4), test system 300 (shown in FIG. 3), and/or electrical and control system 200 (shown in FIG. 2). Method 500 includes defining 502 a plurality of test parameters for wind turbine test 400. The test parameters include, without limitation, a number of wind turbines 100 to test, one or more operational parameters 402 (shown in FIG. 4) of wind turbine 100 to test and/or optimize, a plurality of test points 404 (shown in FIG. 4) for one or more operational parameters 402, values for test values 426 (shown in FIG. 4), values for test point durations 440 and/or other test point components 438, a number of times to execute wind turbine test 400, a number of times to include each test point 404 within wind turbine test 400 and/or within test sequence 442 (shown in FIG. 4), and/or any suitable parameter of wind turbine test 400. At least one test sequence is defined 504, such as test sequence 442. Test sequence 442 randomizes an order of test points 404 or uses any suitable algorithm, such as described above in reference to FIG. 4, to determine an order of test points 404. Moreover, if multiple test sequences 442 are associated with different values of one or more operational conditions of wind turbine 100, then each test sequence 442 is defined 504. Wind turbine test 400 is initiated 506, and wind turbine test 400 executes test points 404 within test sequence 442. At each test point 404 within test sequence 442, one or more operational parameters 402 are set to one or more test values 426, and at least one operating condition of wind turbine 100 is measured.

Test data is received 507 at each test point 404, and the test data includes the measurements of the operating conditions and/or any suitable data. The test data is stored 508 or downloaded into memory 304 (shown in FIG. 3) and/or any suitable memory. The test data is stored 508 at any suitable frequency, including, without limitation, at each test point 404, hourly, daily, or nonperiodically. The test data is analyzed 510 by controller 302 or any suitable controller, and controller 302 or any suitable controller decides 512 whether to end wind turbine test 400 early (i.e., before all test points 404 of wind turbine test 400 have been executed). For example, wind turbine test 400 may be ended early if controller 302 or any suitable controller analyzes 510 the test data and determines that wind turbine test 400 is not suitably likely to improve, optimize, and/or reach a desired value of one or more operational parameters 402. If wind turbine test 400 is not ended early, wind turbine test 400 ends 514 when all test points 404 have been executed, and wind turbine 100 resumes 516 normal operation. The test data is analyzed 518, and an optimized or desired value is determined 520 for one or more operational parameters 402 that were tested by wind turbine test 400.

If wind turbine test 400 is ended early, controller 302 or any suitable controller determines 522 if sufficient test data exists to determine an optimized or desired value for one or more operational parameters 402. If sufficient test data exists, an optimized or desired value is determined 520 for one or more operational parameters 402 that were tested by wind turbine test 400. If insufficient test data exists, one or more operational parameters 402 that were modified during wind turbine test 400 are reset 524 to original values or settings (i.e., the values or settings that the one or more operational parameters had before wind turbine test 400 began execution), and wind turbine 100 resumes normal operation.

After the optimized or desired value is determined 520 for one or more operational parameters 402, the optimized or desired value is reviewed. In the exemplary embodiment, a technician, an operator, a user, and/or any suitable person reviews the optimized or desired value. Alternatively, controller 302 or any suitable reviewing system reviews the optimized or desired value. If the optimized or desired value is approved 526, one or more operational parameters 402 are set 528 to the optimized or desired value, and wind turbine 100 resumes operation. If the optimized or desired value is not approved 526, one or more operational parameters 402 that were modified during wind turbine test 400 are reset 524 to original values or settings, and wind turbine 100 resumes normal operation.

The embodiments described herein test one or more operational parameters of a wind turbine to facilitate selecting a desired or optimal value for the operational parameter. A wind turbine test includes a randomized test sequence of test points, and each test point includes at least one test value for the operational parameter and a test point duration. The random selection of test points within the test sequence facilitates reducing a distortion or a skewing of test data due to changing environmental conditions. Moreover, individual test points may be included more than once within the test sequence to aid in downstream response surface model building and testing goodness-of-fit. The execution of the test and the measurements of one or more operating conditions of the wind turbine at each test point facilitate providing a robust body of test data that may be used to optimize or select a desired value for the operational parameter. Moreover, parameter settings to achieve improved operation may be determined using the test data obtained during the wind turbine test.

A technical effect of the systems and method described herein includes at least one of: (a) defining a plurality of test parameters that include a plurality of test points for at least one wind turbine operational parameter; (b) defining at least one test sequence of a plurality of test points; (c) initiating a test that executes a plurality of test points within at least one randomized test sequence and measures at least one operating condition of at least one wind turbine at each test point.

Exemplary embodiments of a wind turbine, a test system for a wind turbine, and a method for optimizing wind turbine operation are described above in detail. The method, wind turbine, and test system are not limited to the specific embodiments described herein, but rather, components of the wind turbine and/or the test system and/or steps of the method may be utilized independently and separately from other components and/or steps described herein. For example, the test system and method may also be used in combination with other power systems and methods, and are not limited to practice with only the wind turbine system as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for optimizing an operation of at least one wind turbine, said method comprising:
    defining a plurality of test parameters that include a plurality of test points for at least one wind turbine operational parameter, each test point of the plurality of test points including a plurality of test values for the wind turbine operational parameter;
    defining at least one test sequence of the plurality of test points; and,
    initiating a test that executes the plurality of test points within the at least one test sequence and measures at least one operating condition of the at least one wind turbine at each test point.

2. A method in accordance with claim 1, wherein said defining at least one test sequence of the plurality of test points further comprises defining at least one randomized test sequence of the plurality of test points.

3. A method in accordance with claim 1, further comprising storing test data in memory, the test data including at least one measurement of the at least one operating condition.

4. A method in accordance with claim 1, wherein said defining a plurality of test parameters further comprises defining an upper limit for the wind turbine operational parameter and a lower limit for the wind turbine operational parameter.

5. A method in accordance with claim 1, wherein said defining at least one test sequence of the plurality of test points further comprises defining at least one test sequence using at least one of an interleaving algorithm, a pseudorandom algorithm, and a predefined set of test points that are cycled through a predetermined number of times.

6. A method in accordance with claim 1, wherein each test point further includes a test point duration, said method further comprising:
    waiting at each test point for the test point duration; and,
    measuring the operating condition during the test point duration.

7. A method in accordance with claim 1, further comprising receiving data from a source external to the wind turbine.

8. A method in accordance with claim 1, further comprising including a plurality of instances of at least one test point of the plurality of test points in the test sequence.

9. A method in accordance with claim 1, wherein said defining a plurality of test parameters further comprises determining a number of wind turbines of the at least one wind turbine to test.

10. A test system for a wind turbine, said test system comprising:
    at least one measurement device configured to measure at least one operating condition of the wind turbine; and,
    a controller communicatively coupled to said measurement device, said controller configured to execute a wind turbine test comprising:

defining a plurality of test points for at least one wind turbine operational parameter, each test point including at least one test value for the wind turbine operational parameter;

determining a randomized test sequence of the plurality of test points;

iterating through the randomized test sequence; and, measuring the operating condition of the wind turbine at each test point.

11. A test system in accordance with claim 10, wherein said wind turbine test further comprises defining an upper limit for the wind turbine operational parameter and a lower limit for the wind turbine operational parameter.

12. A test system in accordance with claim 11, wherein each test value of each test point is at least one of equal to the upper limit, equal to the lower limit, and between the upper limit and the lower limit.

13. A test system in accordance with claim 10, wherein each test point further includes a test point duration, said controller configured to wait at each test point for the test point duration.

14. A test system in accordance with claim 13, wherein the operating condition is measured during the test point duration.

15. A test system in accordance with claim 10, wherein the randomized test sequence comprises a plurality of instances of at least one test point of the plurality of test points.

16. A test system in accordance with claim 10, wherein said wind turbine test further comprises optimizing the wind turbine operational parameter based on the measured operating condition of the wind turbine.

17. A test system in accordance with claim 10, wherein said wind turbine test further comprises storing the operating condition measurement in memory.

18. A wind turbine, comprising:
at least one component comprising at least one of a blade, a rotor, a gearbox, a power converter, and a generator;
at least one measurement device configured to measure at least one operating condition of said wind turbine; and,
a controller communicatively coupled to said measurement device, said controller configured to execute a wind turbine test comprising:
defining a plurality of test points for at least one wind turbine operational parameter associated with the component, each test point of the plurality of test points including at least one test value for the wind turbine operational parameter;
determining a test sequence of the plurality of test points;
iterating through the test sequence; and,
measuring the operating condition of the wind turbine at each test point of the plurality of test points.

19. A wind turbine in accordance with claim 18, wherein each test point further includes a test point duration, said controller configured to:
wait at each test point for the test point duration; and,
measure the operating condition during the test point duration.

20. A wind turbine in accordance with claim 18, wherein said wind turbine test further comprises optimizing the wind turbine operational parameter based on the measured operating condition of the wind turbine.

* * * * *